United States Patent
Umebayshi et al.

(10) Patent No.: US 6,944,377 B2
(45) Date of Patent: Sep. 13, 2005

(54) OPTICAL COMMUNICATION DEVICE AND LAMINATED OPTICAL COMMUNICATION MODULE

(75) Inventors: Nobuhiro Umebayshi, Tsukuba (JP); Hideo Daimon, Tsukuba-gun (JP); Tetsuhiko Sambei, Toride (JP); Akito Sakemoto, Tsukuba-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/383,547

(22) Filed: Mar. 10, 2003

(65) Prior Publication Data

US 2004/0091211 A1 May 13, 2004

(30) Foreign Application Priority Data

Mar. 15, 2002 (JP) ........................................ 2002-072244

(51) Int. Cl.[7] ................................................ G02B 6/30
(52) U.S. Cl. ........................................................ 385/49
(58) Field of Search ............................................. 385/49

(56) References Cited

U.S. PATENT DOCUMENTS

| | | | |
|---|---|---|---|
| 5,195,154 A | 3/1993 | Uchida | |
| 6,456,766 B1 * | 9/2002 | Shaw et al. | 385/47 |

FOREIGN PATENT DOCUMENTS

| | | |
|---|---|---|
| JP | A 54-139847 | 10/1979 |
| JP | A 61-93419 | 5/1986 |
| JP | 61-148405 A | 7/1986 |
| JP | A 61-148406 | 7/1986 |
| JP | A 63-253315 | 10/1988 |
| JP | A 2-9183 | 1/1990 |
| JP | A 2-73311 | 3/1990 |
| JP | A 3-39913 | 2/1991 |
| JP | 4-27904 A | 1/1992 |
| JP | A 5-264833 | 10/1993 |
| JP | 6-67051 A | 3/1994 |
| JP | 1-223403 A | 9/1996 |
| JP | 10-82925 A | 3/1998 |
| JP | A 10-170765 | 6/1998 |
| JP | 11-38245 A | 2/1999 |
| JP | 11-84183 A | 3/1999 |
| JP | 2000-39530 A | 2/2000 |
| JP | 2000-47044 A | 2/2000 |
| JP | 2000-193838 A | 7/2000 |
| JP | 2001-116945 A | 4/2001 |
| JP | A 2001-133645 | 5/2001 |
| JP | 2002-508856 A | 3/2002 |
| WO | WO 98/59268 | 12/1998 |

* cited by examiner

Primary Examiner—John R. Lee
Assistant Examiner—Phillip A. Johnston
(74) Attorney, Agent, or Firm—Oliff & Berridge, PLC

(57) ABSTRACT

It is an object of the invention to supply an optical communication device and an optical communication module that are provided with a substrate, a vertical waveguide that is formed in the substrate and that is for transmitting light in a thickness direction of the substrate, a horizontal waveguide that is formed in the substrate and that is for transmitting light in a planar direction of the substrate, and a light bending portion for optically coupling the vertical waveguide and the horizontal waveguide. The substrate is a laminated body including a first substrate in whose surface a groove is formed and in which a reflective mirror is disposed on at least one end of the groove, and a second substrate layered to the surface of the first substrate in which the groove is formed and in which a through hole located in opposition to the portion of the groove in which the reflective mirror is disposed is formed. The horizontal waveguide includes a cavity formed by the groove and a reflective film that covers the wall surfaces of the cavity, and transmits light through its cavity. The vertical waveguide include a cavity formed by the through hole and a reflective film that covers the wall surfaces of the cavity, and transmits light through its cavity. The light bending portion includes the reflective mirror, and due to reflection at the surface of the reflective mirror, the light transmission direction is changed from the thickness direction to the planar direction of the substrate or from the planar direction to the thickness direction of the substrate.

6 Claims, 7 Drawing Sheets

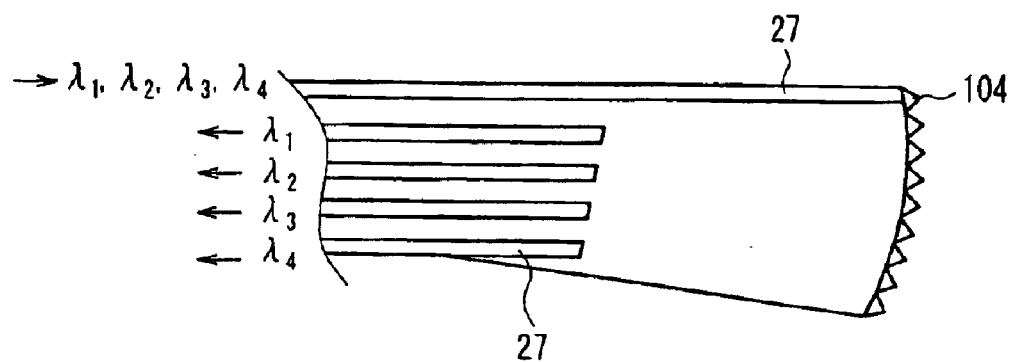
F I G. 5
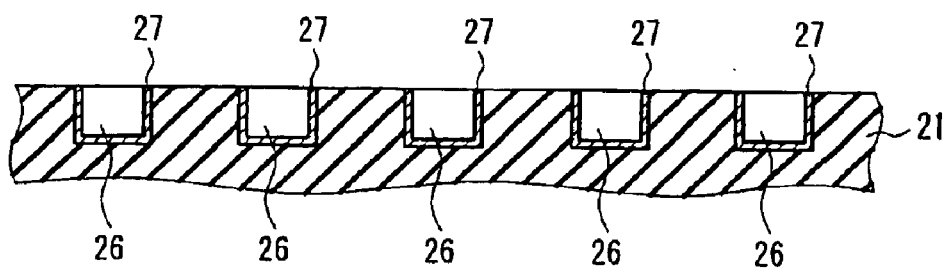
F I G. 6
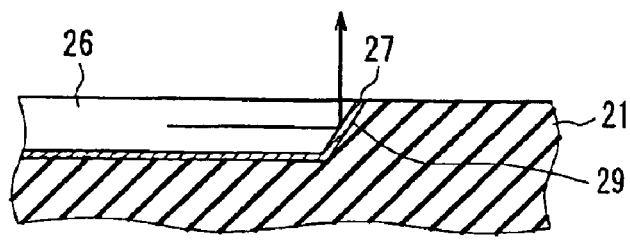
F I G. 7

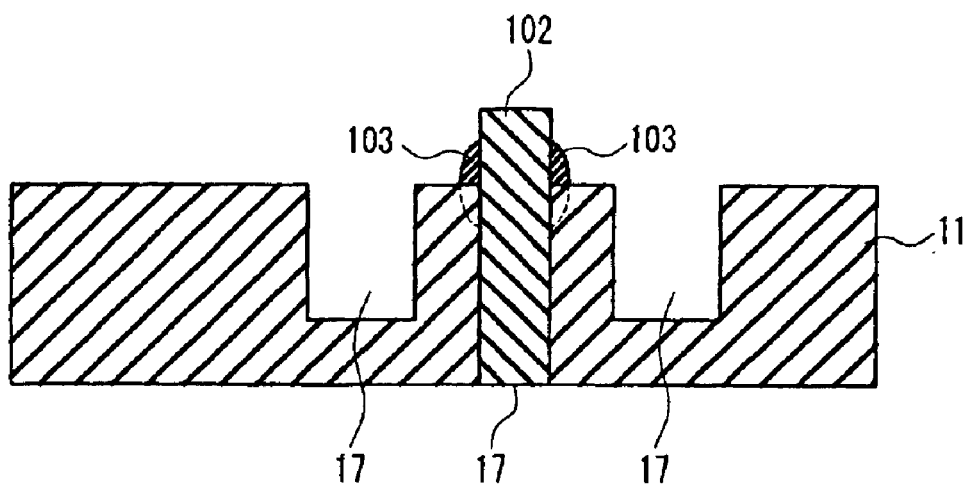
F I G. 15
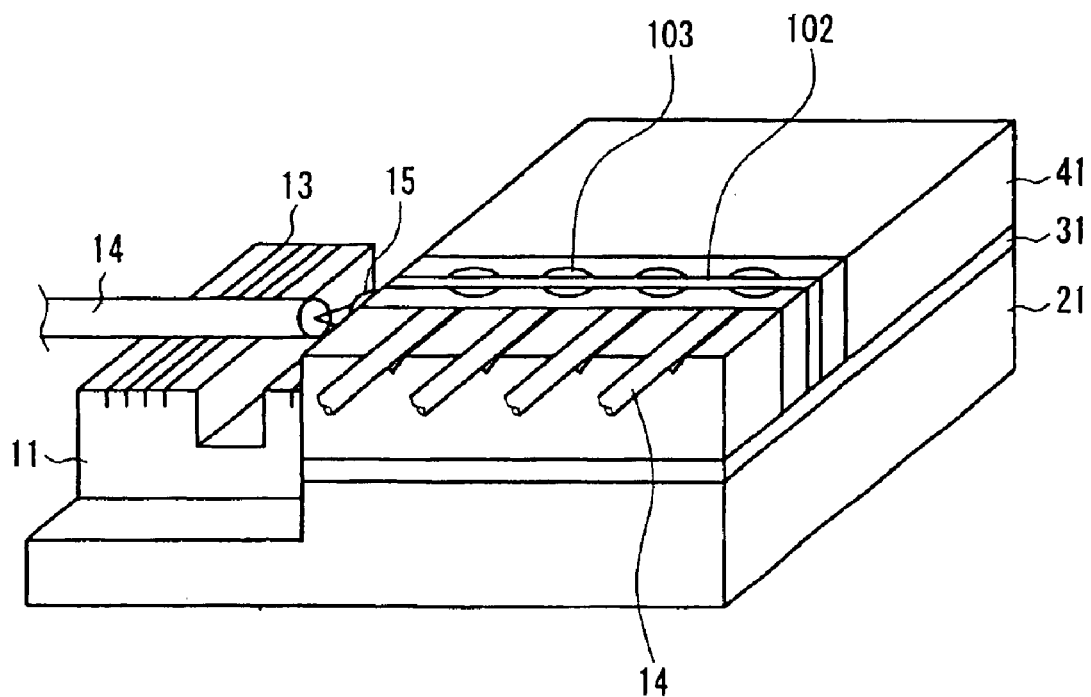
F I G. 16

US 6,944,377 B2

OPTICAL COMMUNICATION DEVICE AND LAMINATED OPTICAL COMMUNICATION MODULE

BACKGROUND OF THE INVENTION

1. Field of the Invention

The present invention relates to optical communication devices used in optical communications and to laminated optical communication modules constituting optical communication devices.

2. Description of the Related Art

The spread of the Internet in recent years has burgeoned a need for the high speed transmission and reception of large quantities of information, such as music, moving images, and computer data. Using optic fibers, data can be sent and received at transfer speeds of 100 Mbps or more for private households. This use of optical fibers allows data to be sent and received at speeds approximately three magnitudes of power faster than with modems or ISDN, which use telephone lines and are widely used in general households. Moreover, in trunk systems, the transmission speed reaches 10 to 40 Gbps. The recent introduction of the new technology called "optical multiplexing transmission" has allowed even faster transfer speeds and larger data amounts.

It is expected that these advances in optical communications will be accompanied by a demand in the field of optical communication devices for progress in technologies for optically coupling optical waveguides such as optic fibers, and elements such as light-receiving elements and light-emitting elements.

Conventionally, an optic fiber and a light-emitting element were optically coupled in a configuration in which light from the light-emitting element was focused by a lens and coupled into the optic fiber (JP S61-93419A).

On the other hand, there are also methods in which an optical waveguide and a light-emitting element or a light-receiving element are coupled without using an optical system such as a lens. With a method for directly coupling a semiconductor laser and an optic fiber, the end of the optic fiber is cut away and its outer ferrule is notched into a L-shape so that chip bonding can be performed. That portion of the outer ferrule notched into an L-shape is adhered to the semiconductor laser, and the center of the optic fiber core and the center of the point of emission of the semiconductor laser chip are aligned (JP S63-253315A). In another method for directly coupling a semiconductor laser chip and an optical waveguide, a gap is provided between the end surface of the active layer of a semiconductor laser and the end surface of the optical waveguide. The semiconductor laser and the optical wavegide are arranged in opposition to one another so that the light is coupled directly into the optical waveguide (JP H3-39913A).

With these conventional light coupling methods, there was the problem that it was difficult to efficiently make light from the light-emitting element incident on the optical waveguide because either an optical distance existed between the light-emitting surface of the light-emitting element and the optical waveguide or various types of optical systems were provided between the light-emitting element and the optical waveguide, thus making it difficult for the devices to be made compact.

With these problems in mind, many light-coupling configurations that achieve light processing functions and also allow the devices to be made compact have been proposed. For example, there has been disclosed a light-coupling component constituted by a five-layered waveguide structure in which a plurality of substrates are arranged three-dimensionally to serve as a means for achieving a compact integrated optical circuit (JP S61-148406A). However, although JP S61-148406A presents an example of a three-dimensional optical circuit component, it adopts a method for connecting the vertical light path and the horizontal light path that exploits the difference in refractive indices between the outside air and the substrates. Thus, the transfer of light power between the vertical light path and the horizontal light path requires a so-called "complete coupling length." Consequently, it was not possible to sharply bend the light path. Moreover, because of this, if the three-dimensional optical circuit was made by stacking a plurality of horizontal circuit boards on top of one another, then it was necessary to provide a predetermined spacing between the horizontal circuit boards. Thus, the horizontal circuit boards could not be adhered to one another.

On the other hand, JP S54-139847A discloses an example in which a reflective layer is provided on the inner surface of the optical waveguide. However, the reflective layer is formed by processing the inner surface of a bendable tube for a laser processing machine. In other words, the publication does not indicate the sharp bending of the light path, nor does it disclose a three-dimensional optical circuit. Also, FIG. 1 of this publication shows that the light path of this conventional laser processing machine is constituted by open space and a reflective mirror, however, the light path is not formed within a substrate.

Also, JP H2-73311A discloses the formation of a hollow waveguide made of gold. However, the gold optical pipe remaining as the outer casing is not bent sharply but rather is formed in a spiral shape. When the optical pipe is bent sharply it is difficult to secure the light path within the pipe.

JP H10-170765A discloses the formation of a V-groove in the surface of a silicon substrate through anisotrophic etching, forming a reflective film on the oblique walls of the V-groove, and then burying an optic fiber inside the V-groove. The light-emitting element or the light-receiving element and the optic fiber are coupled to one another via the reflective film. However, with this method the optic fiber must be arranged in a straight line, and it is not possible to form a waveguide that is bent freely in the horizontal surface.

JP 2001-133645A discloses metalizing the upper surface, lower surface, and side surfaces of a substrate in which a waveguide is formed in order to block out aberrant light from the waveguide substrate. However, there is no disclosure of metalizing the waveguide itself and bending the light path sharply.

JP H2-9183A mentions an apparatus that serves as an optoelectronic device assembly in which a groove portion is provided in a substrate and a reflector is partially provided on an end face of the groove portion. In this apparatus, an optic fiber is inserted into the groove portion and a device is arranged above the reflector, so that the optic fiber and the device are coupled through the reflector. However, in this apparatus, light is transmitted to the device via the optic fiber, and thus there are limits as to how compact the apparatus can be made.

JP H5-264833A mentions a waveguide made by forming a resist layer, which is an applied layer, on a substrate, forming a cavity within the resist, and then forming a reflective film on the inside wall of the cavity. However, the waveguide is not formed within the substrate but rather is formed inside the resist layer formed on the substrate. The shape of the resist is easily altered due to the outside environment (for example, temperature) or stress, and thus it is difficult to secure sufficient durability with a waveguide that is formed inside a resist layer.

SUMMARY OF THE INVENTION

One aspect of the present invention is an optical communication device having a substrate and a waveguide formed inside the substrate, wherein at least one end of the waveguide can be optically coupled to an outside light path, wherein the waveguide includes a cavity formed inside the substrates and a reflective film covering the wall surfaces of the cavity, and light is transmitted within the cavity.

Another aspect of the present is a laminated optical communication module. This module includes a substrate; a vertical waveguide that is formed in the substrate and that is for transmitting light in a thickness direction of the substrate; a horizontal waveguide that is formed in the substrate and that is for transmitting light in a planar direction of the substrate; and a light bending portion for optically coupling the vertical waveguide and the horizontal waveguide, wherein the substrate is a laminated body including a first substrate in whose surface a groove is formed and in which a reflective mirror is disposed on at least one end of the groove, and a second substrate layered to the surface of the first substrate in which the groove is formed and in which a through hole in communication with a portion of the groove where the reflective mirror is disposed is formed; wherein the horizontal waveguide includes a first cavity formed by the groove and a first reflective film that covers the wall surfaces of the first cavity, and transmits light through its first cavity; wherein the vertical waveguide includes a second cavity formed by the through hole and a second reflective film that covers the wall surfaces of the second cavity, and transmits light through its second cavity; and wherein the light bending portion includes the reflective mirror, and due to reflection at the surface of the reflective mirror, the light transmitting direction is changed from the thickness direction to the planar direction of the substrate or from the planar direction to the thickness direction of the substrate.

Another aspect of the invention is an optical communication device comprising a plurality of optical communication modules which are optically coupled to one another, wherein at least one of the optical communication modules is the laminated optical communication module described above.

BRIEF DESCRIPTION OF THE DRAWINGS

FIG. 5 is a partial magnified view showing the portion of the first layer substrate in which the waveguides and the diffraction grating are formed.

FIG. 6 is a cross-sectional view taken along the line A–A' in FIG. 4.

FIG. 7 is a cross-sectional view taken along the line B–B' in FIG. 4.

FIG. 15 is a cross-sectional view taken along the line A–A' in FIG. 14.

FIG. 16 is an exterior perspective view showing another example of an optical communication device according to the present invention.

DETAILED DESCRIPTION OF THE PREFERRED EMBODIMENTS

Figure 1:
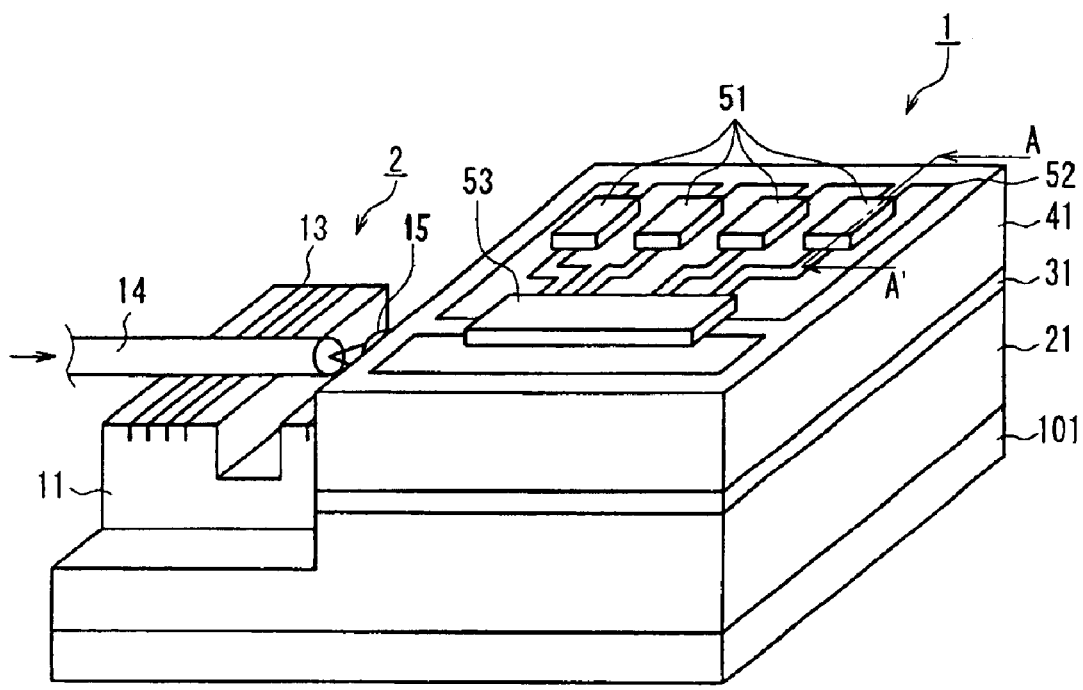
FIG. 1 is an exterior perspective view showing an example of an optical communication device according to the first embodiment of the invention.

An optical communication device of the present invention has a substrate and a waveguide formed inside the substrate, wherein at least one end of the waveguide can be optically coupled to an outside light path, and the waveguide includes a cavity formed inside the substrate and a reflective film covering the wall surfaces of the cavity, and light is transmitted within the cavity.

In an optical communication device with this configuration the interior walls of the waveguide are covered with a reflective film, and thus the transmission efficiency of light is high.

Also, with this optical communication device, the light path can be bent sharply, and thus the device can be made compact. To bend the light path, it is sufficient to form a light bending portion in the waveguide and at the light bending portion to slope the wall surface of the cavity of the waveguide with respect to the light transmitting direction. By covering the sloped surface with the reflective film, it can be allowed to function as a reflective mirror for changing the light transmitting direction.

In this optical communication device, it is preferable that the substrate is a laminated body including a first substrate in whose surface a groove is formed and a second substrate layered to the surface of the first substrate in which the groove is formed, and that the cavity of the waveguide is formed by the groove. Such an optical communication device is advantageous because it can be fabricated easily, and allows waveguides with complex shapes to be formed.

It is preferable that the optical communication device further includes an optical circuit element that is optically coupled to an end of the waveguide, and that the end of the optical waveguide can be optically coupled to the outside light path via the optical circuit element. The optical circuit element can, for example, be a passive optical element. Specific examples thereof include diffraction gratings, optical filters, optical switches, and attenuators. Providing such an optical circuit element within the optical communication device allows incident and emitted light to be split or multiplexed, for example.

It is preferable that the optical communication device further includes a photoelectric conversion element that is optically coupled to an end of the waveguide, and electrical wiring formed on the surface of the substrate, and that the photoelectric conversion element can be electrically connected to an outside electrical circuit via the electrical wiring. This optical communication device has the advantage of a wide range of application because light signals and electrical signals can be converted between one another.

Also, in this optical communication device, it is preferable that a light-transmitting medium is filled into the cavity of the waveguide. In a preferable example thereof, the stability of the waveguide with respect to outside stress is increased, allowing the impact on optical properties due to water or mold caused by condensation to be significantly reduced. An example of the light-transmitting medium is a resin such as an ultraviolet curable resin.

In this optical communication device, it is preferable that the reflective film is a metallic film. In a preferable example thereof, good reflective properties can be obtained, thus allowing the transmission efficiency of the waveguide to be further increased. Also, by making the reflective film a metallic film, there is the benefit that the reflective film can be used as electrical wiring. Also, it is preferable that plating is used to form the metallic film, because plating allows a uniform metallic film to be formed.

It is preferable that the optical communication device further includes a support body on which a groove for mounting an optic fiber is formed, that the support body is disposed so that an end of the groove and an end of the waveguide are in opposition to one another, and that when the optic fiber is mounted on the groove, the waveguide is optically coupled to the optic fiber.

It is preferable that a coupling lens is mounted on the support body in such a manner that it is located between an end of the groove and an end of the waveguide, and that when the optic fiber is mounted on the groove, the end of the waveguide is optically coupled to the optic fiber via the coupling lens. The coupling lens is preferably made of silicon. By using silicon with a high refractive index, the curvature of the lens can be reduced, thus allowing aberration to be reduced and the spot diameter to be made smaller.

It is preferable that a metallic film is formed on the wall surfaces of the groove for mounting the optic fiber of the support body. Thus, the optic fiber can be mounted onto the support body through a metal bond such as solder.

If the coupling lens is mounted on the support body, then it is preferable that a metallic film is formed on the portion of the support body in which the coupling lens is arranged, that a metallic film is formed on lateral surfaces of the coupling lens, and that these metallic films are metallically bonded to one another.

An optical communication module of the present invention is provided with a substrate; a vertical waveguide that is formed in the substrate and that is for transmitting light in a thickness direction of the substrate; a horizontal waveguide that is formed in the substrate and that is for transmitting light in a planar direction of the substrate; and a light bending portion for optically coupling the vertical waveguide and the horizontal waveguide; wherein the substrate is a laminated body including a first substrate in whose surface a groove is formed and in which a reflective mirror is disposed on at least one end of the groove, and a second substrate layered to the surface of the first substrate in which the groove is formed and in which a through hole in communication with a portion of the groove where the reflective mirror is disposed is formed; wherein the horizontal waveguide includes a cavity formed by the groove and a reflective film that covers the wall surfaces of the cavity, and transmits light through its cavity; wherein the vertical waveguide includes a cavity formed by the through hole and a reflective film that covers the wall surfaces of the cavity, and transmits light through its cavity; and wherein the light bending portion comprises the reflective mirror, and due to reflection at the surface of the reflective mirror, the light transmitting direction is changed from the thickness direction to the planar direction of the substrate or from the planar direction to the thickness direction of the substrate.

This configuration makes it possible to form a three-dimensional circuit by providing light bending portions in the module, allowing the optical communication module to be made compact. Also, because a reflective film is formed in the waveguide, the transmission efficiency of the light is good. Furthermore, because the substrates are adhered to one another, the circuit board can be made thinner.

Here, the "optical communication module" can be used alone as an optical communication device, but ordinarily a plurality of optical communication modules are coupled to one another to make up a single optical communication device. Therefore, an optical communication module also has the characteristic of being able to serve as a structural component making up an integrated optical circuit.

It is preferable that the optical communication module further includes, in the substrate, an optical circuit element that is optically coupled to at least one of the horizontal waveguide and the vertical waveguide. The optical circuit element may be the same as the elements mentioned above. Providing such an optical circuit element within the module allows incident and emitted light to be split or multiplexed, for example.

It is also preferable that the communications module further includes a photoelectric conversion element that is optically coupled to an end of the waveguide, and electrical wiring formed on the surface of the substrate, and that the photoelectric conversion element can be electrically connected to an outside electrical circuit via the electrical wiring. This optical communication module has the advantage of a wide range of application because light signals and electrical signals can be converted between one another.

In the optical communication module, it is preferable that the reflective film and the reflective mirror are a metallic film. In a preferable example thereof, good reflective properties can be obtained, thus allowing the transmission efficiency of the waveguide to be further increased. Also, by making the reflective film a metallic film, there is the benefit that the reflective film can be used as electrical wiring. Also, it is preferable that plating is used to form the metallic film because plating allows a uniform metallic film to be formed.

Also, in the optical communication module, it is preferable that a light-transmitting medium is filled into the cavities forming the vertical waveguide and the horizontal waveguide. In a preferable example thereof, the stability of the waveguide with respect to outside stress is increased, allowing the impact on optical properties due to water or mold caused by condensation to be significantly reduced. An example of the light-transmitting medium is a resin such as an ultraviolet curable resin.

Preferable embodiments of the present invention are described next with reference to the drawings.

First Embodiment

Figure 2:
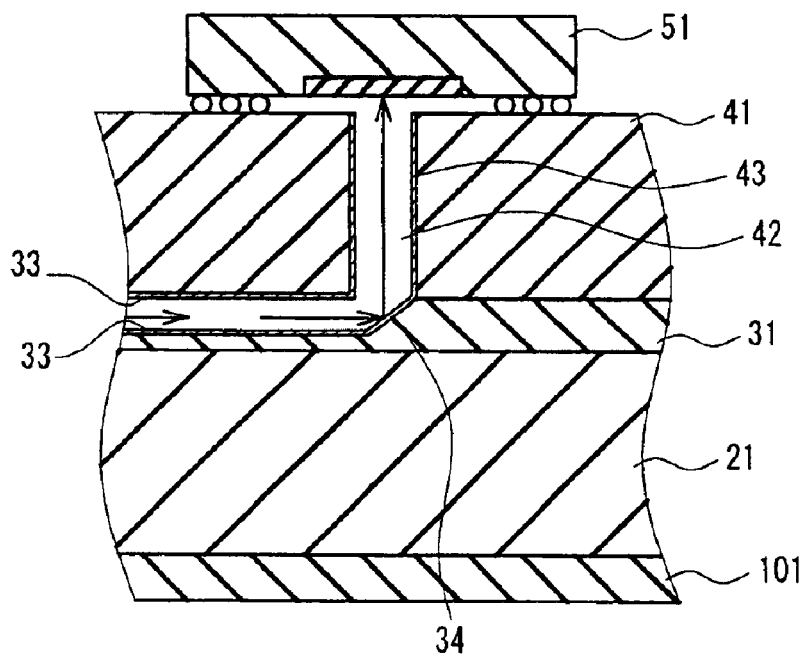
FIG. 2 is a cross-sectional view taken along the line A–A' in FIG. 1.

FIG. 1 is a perspective view showing an example of the optical communication device according to the present invention. FIG. 2 is a cross-sectional view of this optical communication device. The optical communication device is provided with an optical circuit portion 1, which is provided with an optical circuit element and a waveguide, and a coupling portion 2 for optically coupling the optical circuit portion 1 to an outside light path (not shown).

In the coupling portion 2, light coupling components 14 and 15 are packaged onto a support body 11. The optical circuit portion 1 is made of a laminated body formed by layering a plurality of substrates, 21, 31, and 41, and the waveguide is formed within this laminated body. The waveguide is arranged so that one of its ends is in opposition to the light coupling component 15. Photoelectric conversion elements 51 are packaged into the substrate 41, which is the uppermost layer of the optical circuit portion 1. The photoelectric conversion elements 51 are arranged so that their light-receiving surface or their light-emitting surface is in opposition to an end of the waveguide. Also, electrical wiring 52 and an electric component 53 are disposed on the optical circuit portion 1. A metallic layer 101 is layered onto the substrate 21, which is the bottommost layer.

As shown in FIG. 2, the transmission light that is incident on the inside of the optical circuit portion from the coupling portion passes through the waveguides formed in the substrates and arrives at the photoelectric conversion portions 51. Conversely, the transmission light that is incident on the inside of the optical circuit portion from the photoelectric conversion portions 51 passes through the waveguides formed in the substrates and is guided to an outside light path (not shown) from the coupling portion.

Next, the members making up the optical communication device are described in detail.

(1) Coupling Portion

The coupling portion is provided with light coupling components for optically coupling the waveguide and an outside light path, and a support body for supporting the light coupling components. It should be noted that an optic fiber and a coupling lens are used as the light coupling components in the example shown in FIG. 1, however, the light coupling components are not limited to these.

For the support body 11, it is possible to use at least one type of substrate selected from the group consisting of a silicon substrate, a plastic substrate, and a glass substrate, for example. It is also possible to use an optical bench made of silicon, for example, as the support body 11.

Figure 3:
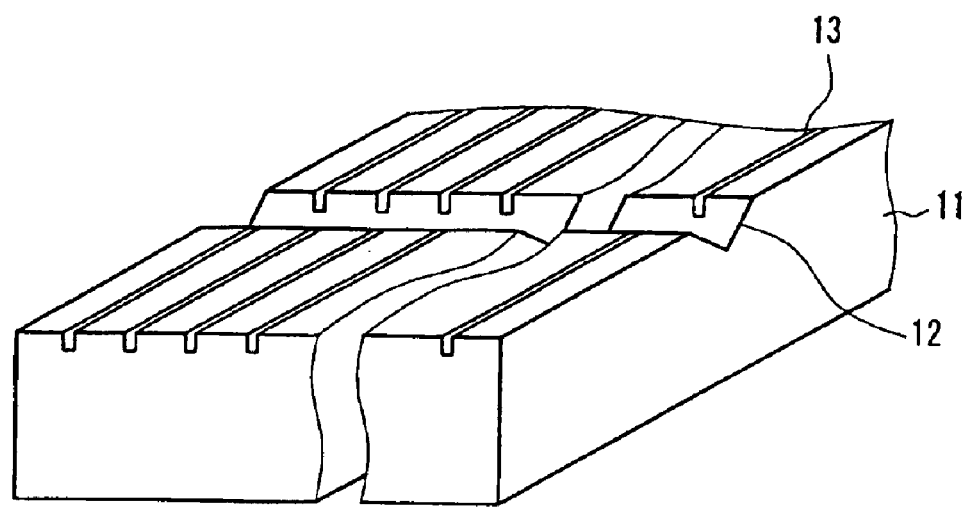
FIG. 3 is an exterior perspective view showing an example of the mounting groove and the adhesion grooves in the coupling portion of the optical communication device.

FIG. 3 is an exterior perspective view of an example of the support body 11. As shown in FIG. 3, a groove 12 in which an optic fiber 14 and a coupling lens 15 are to be mounted (hereinafter, this groove is called a "mounting groove") is formed in the surface of the support body 11. The mounting groove 12 is preferably parallel to the optical axes of the optic fiber and the coupling lens that are mounted and has a shape in which the bottom portion of the groove is narrower than the upper portion (open portion). That is, it is preferable that the lateral wall surfaces of the mounting groove are parallel to the optical axes and also sloped with respect to the substrate surface. Examples of the shape of the mounting groove 12 include a V-shaped groove and an inverted plateau-shaped groove.

If a silicon substrate is used as the support body 11, then an example of a method for forming the mounting groove 12 is a method of forming a mask pattern having an opening at the spot where the groove is to be formed in the surface of the silicon substrate, and then etching the substrate surface. The etching is preferably anisotrophic etching. An example of anisotrophic etching is wet etching, and if wet etching is employed, then as the etchant it is possible to use potassium hydroxide (KOH), sodium hydroxide (NaOH), tetramethyl ammonium hydroxide (TMAH), hydrazine (EPW), $HgCl_2$, or $K_2Fe(CN)_6$. For example, when these etchants are used to etch the (100) face of the silicon, their anisotrophic properties yield a V-shaped groove (with an apex angle of approximately 70°) with (111) faces sloped approximately 54.7° from the surface ((100) face). Also, when the width of the opening in the mask is increased, it is possible to form a bottom surface in the (100) face in the V-shaped groove, thus forming an inverted plateau-shaped groove. If a glass substrate or a plastic substrate is used, then it is, for example, possible to form a groove of a desired shape through molding.

Moreover, a plurality of grooves 13 (hereinafter, these are referred to as "adhesion grooves") are formed in the surface of the support body 11 in such a manner that they cross over the mounting groove 12. In this embodiment, an adhesive agent is filled into the adhesion grooves 13 so as to fasten the optic fiber and the coupling lens in the mounting groove 12. If an optic fiber, for example, is mounted in the mounting groove of the optical bench, then when an adhesive agent is filled directly into the mounting groove and the optic fiber, for example, is disposed on that adhesive agent, there is the risk that the optic fiber, for example, will become fixed, raised and bulging out above the mounting groove. However, in this embodiment, the optic fiber, for example, is fastened in the mounting groove 12 by filling an adhesive agent into the adhesion grooves 13, which cross over the mounting groove 12, thus allowing the optic fiber, for example, to be mounted without the above problem and without impairing its function. It should be noted that there are no particular limitations to the width and the depth of the adhesion grooves 13, although in order for the adhesive agent to be filled by capillary action they are preferably 10 to 500 pm and more preferably 50 to 200 μm. Also, there are no particular limitations as to the number of the adhesion grooves 13, and the number can be suitably set to correspond to the dimensions of the optic fiber or the coupling lens that is mounted, and can for example be from 1 to 20 and preferably 5 to 10. There are no particular limitations regarding the spacing between the adhesion grooves 13, however, from the standpoint of increasing the adhesion strength, this spacing is preferably 0.5 to 3 mm and more preferably 1 to 2 mm.

One possible method for forming the adhesion grooves 13 is to form them through a machining process that uses dicing, for example. It is also possible to form them through an etching process. In this case, it is possible to adopt a method in which a flattened resist is applied onto the mounting groove, and after it has dried, an inorganic film is formed thereon on by spin-coating or the like (SOG: spin on glass); a resist is applied onto this film; a mask pattern for forming openings corresponding to the adhesion grooves is formed on this resist; and then the SOG, the flattened resist, and the substrate are etched to form the adhesion grooves, after which the resist and the SOG, for example, are removed.

The optic fiber 14 and the coupling lens 15 are mounted onto the support body 11, which has the mounting groove 12 and the adhesion grooves 13. This mounting is carried out using an adhesive agent as described above, and an ultraviolet curable resin, for example, can be used as this adhesive agent.

The optic fiber 14 may be any conventionally known optic fiber that transmits light. The optic fiber 14 may be a glass fiber or a plastic fiber, for example, however, a quartz glass fiber is desirable from the standpoint that there is little loss of light, for example. Also, it is sufficient that the coupling lens 15 is able to efficiently guide light that has been transmitted through the optic fiber 14 into the waveguide and is able to efficiently guide light that has been transmitted through the waveguide into the optic fiber 14. For example, the coupling lens 15 may be a GRIN lens, a ball lens, or a mold lens, among others. Also, there are no particular limitations regarding the material of the coupling lens 15, and it is possible to use glass or silicon, for example.

(2) Optical Circuit Portion

The optical circuit portion has a configuration in which a plurality of substrates are layered adhered to one another, and waveguides are formed inside this laminated body. As to the waveguides, the circuit portion is provided with vertical waveguides for transmitting light in the thickness direction of the substrates and horizontal waveguides for transmitting light in the planar direction of the substrate. It is preferable that the vertical waveguides and the horizontal waveguides are optically coupled to one another. Thus, it is possible to achieve a three-dimensional light path in which the waveguides are three-dimensionally linked to one another. Also, it is preferable that optical circuit elements are disposed inside or on the surface of the laminated body, in which case the optical circuit is made by coupling the optical elements to the waveguides.

A specific example of the optical circuit portion is described below using the drawings.

As shown in FIG. 1 and FIG. 2, the optical circuit portion 1 is constituted by a laminated body formed by layering the first layer substrate 21, the second layer substrate 31, and the third layer substrate 41, in that order, directly onto one another.

For these substrates, it is possible to use at least one type of substrate selected from the group consisting of silicon substrates, plastic substrates, and glass substrates, however, taking stability into account, it is preferable that silicon substrates or glass substrates are used. These substrates can be used in combination with other types of substrates, however, from the standpoint of stability with respect to heat cycles and the closeness of the adhesion between substrates, it is preferable that the same type of substrate is used, and it is particularly preferable that silicon substrates are used.

First horizontal waveguides and an optical circuit element coupled to an end portion of the first horizontal waveguides are formed in the first layer substrate 21. Here, a diffraction grating serves as the optical circuit element. Second horizontal waveguides are formed in the second layer substrate 31, and vertical waveguides are formed in the third layer substrate 41. It should be noted that the first horizontal waveguides and the second horizontal waveguides, and the second horizontal waveguides and the vertical waveguides, are optically coupled to one another through light bending portions provided with reflective mirrors. Thus, the first horizontal waveguides, the second horizontal waveguides, and the vertical waveguides are linked, creating a three-dimensional light path that extends three-dimensionally. Photoelectric conversion elements are arranged at predetermined locations in the surface of the third layer substrate 41, and are optically coupled to the vertical waveguides. Also, an electric component is disposed at a predetermined location on the surface of the third layer substrate 41, and is electrically connected to the photoelectric conversion elements via the electrical wiring 52. A metallic layer is layered onto the rear surface of the first layer substrate.

Next, the above-mentioned substrates are described in detail.

First Layer Substrate

Figure 4:
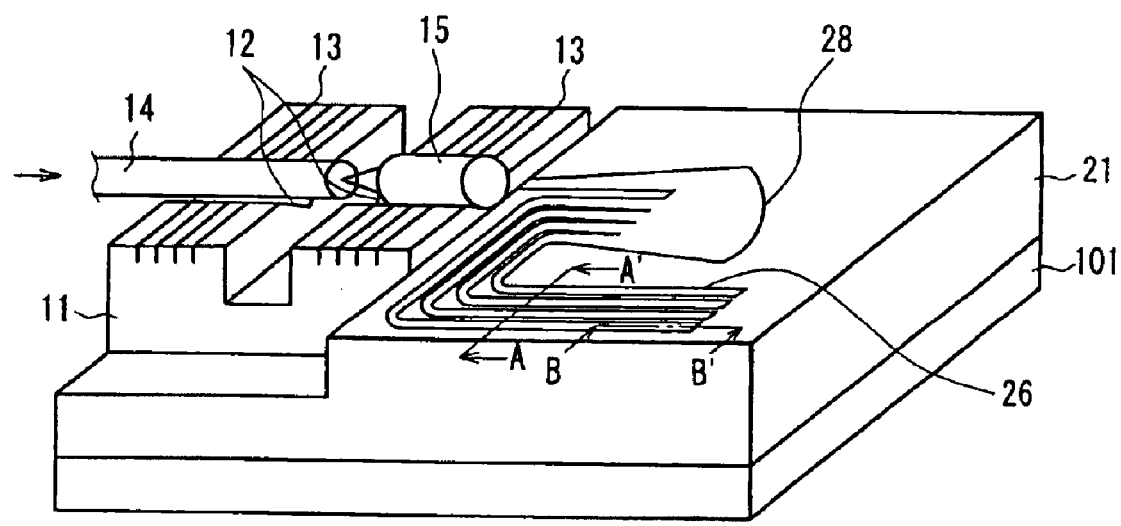
FIG. 4 is an exterior perspective view of the first layer substrate of the optical circuit portion of the optical communications portion.

FIG. 4 is an exterior perspective view showing an example of the first layer substrate 21. FIG. 5 is a partial magnified view showing the portion of the first layer substrate in which the waveguides and the optical circuit element are formed.

As shown in FIG. 4, grooves that serve as first horizontal waveguides 26 are formed in the surface of the first layer substrate 21. These grooves form cavities when the second layer substrate is layered, and these cavities function as light transmission paths. An end of the first horizontal waveguides 26 is optically coupled to the waveguides formed in the second layer substrate. It should be noted that there are no particular restrictions regarding the cross-sectional shape of these grooves.

A diffraction grating 28, which is the optical circuit element 28, is formed in the surface of the first layer substrate 21. As shown in FIG. 4, the diffraction grating 28 is achieved by forming a recess in the surface of the substrate 21 and then forming a periodic structure in the wall surfaces of this recess. The first horizontal waveguides and the diffraction grating 28 are optically coupled. There are no limitations as to the method for coupling them. However, from the standpoint of increasing the transmission efficiency of the light, it is preferable that, as shown in the drawing, the grooves forming the first horizontal waveguides 26 and the recess in which the diffraction grating 28 is formed are in communication with one another and are provided as a single unit. Also, the opening through which light is incident on the diffraction grating 28 is coupled to an outside light path (not shown) via a coupling portion.

Figure 8:
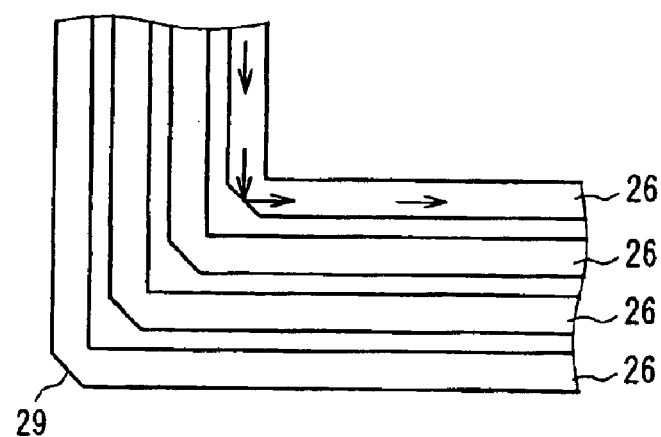
FIG. 8 is a plan view showing the light bending portions of the waveguides formed in the first layer substrate.

FIGS. 6 to 8 are diagrams showing an example of the first horizontal waveguides 26. FIGS. 6 and 7 are cross-sectional views taken along the lines A–A' and B–B' of FIG. 4. Also, FIG. 8 is a partial magnified view of the bent portions of the first horizontal waveguides.

As shown in FIG. 6, the reflective film 27 is formed over the wall surfaces of the grooves serving as the first horizontal waveguides 26. By forming the reflective film 27, light is completely reflected within the waveguides, allowing the light to be transmitted effectively. Various types of metal films can be used as the reflective film 27, and it is preferable that a metallic film such as Au, Ag, Ni, or Cu is used. Also, there are no particular limitations regarding the thickness of the metal film, and it is for example 0.05 to 5 82 m and preferably 0.10 to 2 $\mu$m.

In order to guide the light that is transmitted through the first horizontal waveguides into the waveguides formed in the second layer substrate, it is necessary to change the direction in which the light is transmitted from the planar direction of the substrate to its thickness direction at the portions where these waveguides are coupled. In this embodiment, as shown in FIG. 7, this change in the transmission direction of the light is achieved by providing light bending portions 29 at the portions where the first horizontal waveguides 26 are coupled with the waveguides formed in the second layer substrate. The light bending portions 29 are achieved by arranging reflective mirrors at the terminal end of the first horizontal waveguides.

Also, because one end of the first horizontal waveguides 26 is optically coupled to the diffraction grating 28 and the other end is coupled to a waveguide formed in the second layer substrate, the first horizontal waveguides 26 are given a shape suited for coupling to these. For this reason, the first horizontal waveguides may be bent as shown in FIG. 8. Bending the waveguides in this fashion allows the planar area of the first layer substrate to be reduced and allows a more compact optical communication device to be attained. In this case, the light transmission direction must be changed in the same plane parallel to the substrate surface at the bent portion of the waveguides. In this embodiment, the light bending portions 29 are provided at the bent portions of the first horizontal waveguides 26 as shown in FIG. 8 in order to achieve this change in the transmission direction of the light. The light bending portions 29 are made by arranging reflective mirrors at the bent portions of the waveguides.

As shown in FIGS. 7 and 8, the reflective mirrors at the light bending portions 29 are provided obliquely with respect to the transmission direction of the light before and after it is bent. The reflective mirrors can be formed by forming a taper at the terminal end or the bent portion of the grooves that make up the first horizontal waveguides 26 and then covering the taper with the reflective film 27. Giving consideration to production of the first substrate, it is preferable that the reflective film 27 of the wall surfaces of the grooves and the reflective mirrors are formed as a single unit. It should be noted that a metallic film like that described above can be used as the reflective film 27. The angle at which the taper is sloped is selected so that the taper is sloped with respect to the transmission direction before and after the light is bent. Thus, it can be suitably selected in correspondence with the shape of the portion where the first horizontal waveguides are coupled to the waveguides of the second layer substrate or the shape of the bent portions, for example. For example, as shown in FIGS. 7 and 8, the slope angle of the taper is preferable set to approximately 45° if the transmission direction of the light is altered approximately 90°.

As mentioned above, the grooves making up the first horizontal waveguides 26 form cavities when the second layer substrate is layered, and these cavities function as light transmission paths. These cavities may remain empty. However, they are preferably filled with a light-transmitting medium, so as to keep the transmission efficiency of light from dropping due to the effects of moisture in the air, for example, that has infiltrated into the optical communication device. Examples of the light-transmitting medium include transmissive resins such as acrylic regions, fluorinated polyimide resins, and fluorinated epoxy resins. The medium may also be a fluid such as a transmissive gel.

Second Layer Substrate

Figure 9:
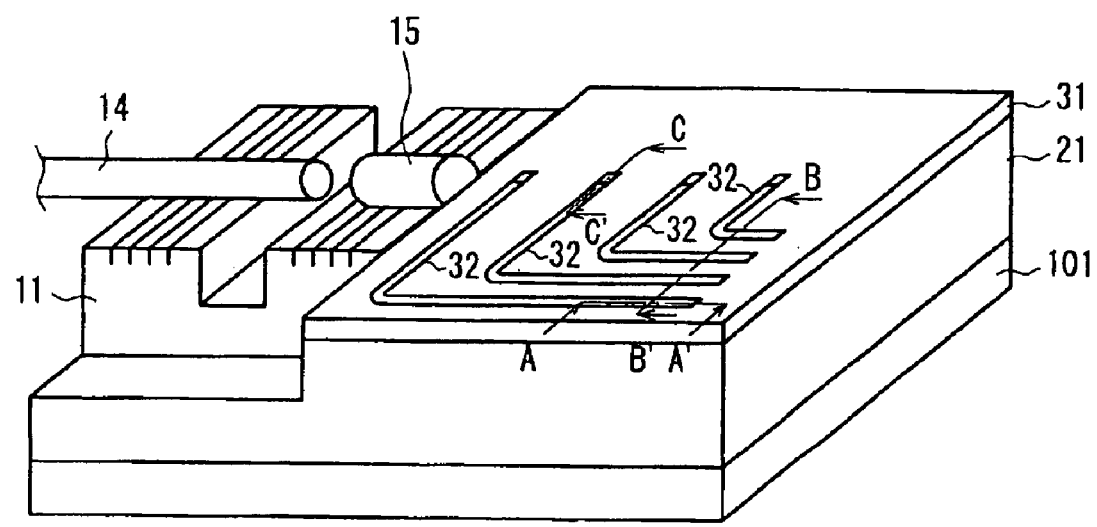
FIG. 9 is an external view showing the second layer substrate making up the optical circuit portion of the optical communication device.

FIG. 9 is an exterior perspective view showing an example of the second layer substrate 31.

As shown in FIG. 9, grooves serving as the second horizontal waveguides 32 are formed in the surface of the second layer substrate 31. These grooves form cavities when the third layer substrate is layered, and these cavities function as light transmission paths. The second horizontal waveguides 32 function as the optical wiring for wiring the optical circuit within the second layer substrate. It should be noted that FIG. 9 shows an example in which four waveguides are formed, however, there are no particular limitations as to the number of waveguides, and this number may be suitably determined to fit the objective. Ordinarily, the number of waveguides that are formed is the same as the number of waveguides formed in the first layer substrate.

Figure 10:
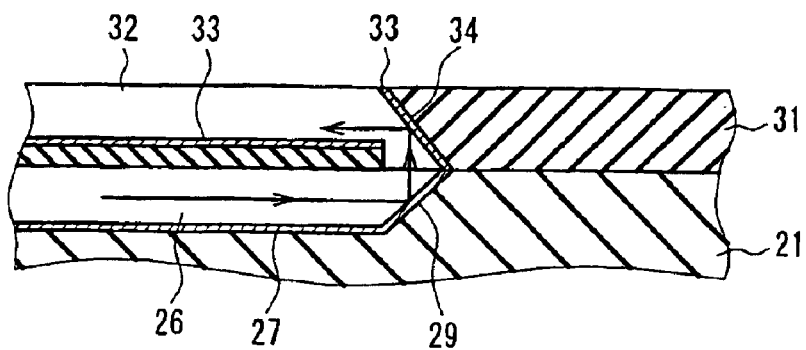
FIG. 10 is a cross-sectional view taken along the line A–A' in FIG. 9.
Figure 11:
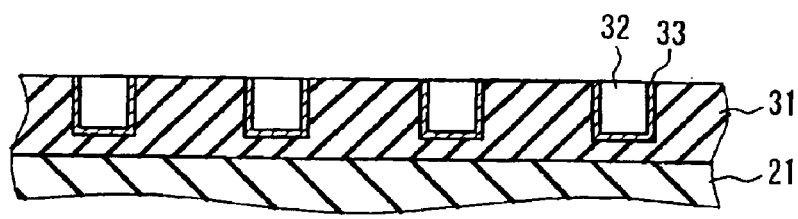
FIG. 11 is a cross-sectional view taken along the line B–B' in FIG. 9.
Figure 12:
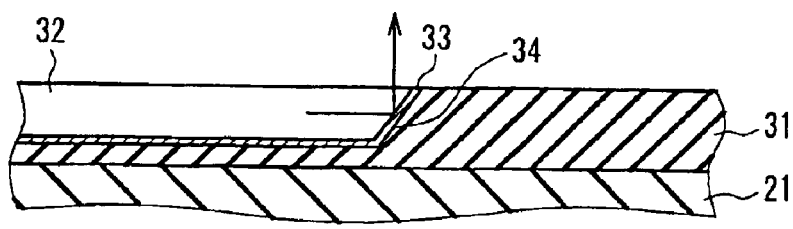
FIG. 12 is a cross-sectional view taken along the line C–C' in FIG. 9.

FIGS. 10 to 12 are diagrams showing an example of the second horizontal waveguides, and are respectively cross-sectional diagrams taken along the A–A' line, the B–B' line, and the C–C' line of FIG. 9.

Like the grooves serving as the first horizontal waveguides 26, a reflective film 33 is formed in the wall surfaces of the grooves serving as the second horizontal waveguides 32 as shown in FIG. 11. It should be noted that the material and the thickness of the reflective film 33 are the same as those for the case of the first horizontal waveguides. Also, like with the first horizontal waveguides, the cavities constituting the second horizontal waveguides 32 may remain empty, but are preferably filled with a light-transmitting medium. The material for this light-transmitting medium is that mentioned previously.

One end of the second horizontal waveguides 32 is optically coupled to the above-mentioned end of the first horizontal waveguides 26. As shown in FIG. 10, openings for linking the first horizontal waveguides 26 and the second horizontal waveguides 32 are formed in the second layer substrate 31 at the portion where the two waveguides are coupled to one another. When light is incident on the second layer substrate 31 from the first horizontal waveguides 26, the light is transmitted in the thickness direction of the substrate and passes through these openings. To guide the incident light that has passed through these openings into the second horizontal waveguides 32, it is necessary to change the transmission direction of the light from the thickness direction to the planar direction of the substrate. In this embodiment, as shown in FIG. 10, light bending portions 34 are provided at the portions of the second horizontal waveguides 32 that are in opposition to the light bending portions 29 of the first horizontal waveguides 26, thereby effecting this change in the transmission direction of the light.

Also, the other end of the second horizontal waveguides 32 is optically coupled to one of the ends of the waveguides formed in the third layer substrate. FIG. 12 shows the portion of the second horizontal waveguides 32 that is coupled to the waveguides formed in the third layer substrate. To guide the light that has been transmitted through the second horizontal waveguides 32 into the waveguides formed in the third layer substrate, it is necessary to change the transmission direction of the light at the portion where the waveguides are coupled to one another from the planar direction to the thickness direction of the substrates. In this embodiment, as shown in FIG. 12, light bending portions 34 are provided at the portions of the second horizontal waveguides 32 where they are coupled to the waveguides formed in the third layer substrate, thereby effecting this change in the transmission direction of the light.

As shown in FIG. 12, the light bending portions 34 are achieved by arranging reflective mirrors at the end portion of the waveguides. These reflective mirrors, in the same manner as in the first layer substrate, can be formed by providing a taper in the grooves serving as the waveguides and then covering the taper with the reflective film 33.

Also, in the second layer substrate, in the same manner as in the first layer substrate, the second horizontal waveguides can be bent in the plane of the substrate. In this case, like with the first layer substrate, light bending portions made of reflective mirrors can be provided at the bent portions of the second horizontal waveguides.

Third Layer Substrate

As shown in FIG. 1, the photoelectric conversion elements 51 are mounted onto the surface of the third layer substrate 41. As the photoelectric conversion elements 51, it is possible to use light-receiving elements such as photodiodes (PDs) or light-emitting elements such as light-emitting diodes (LEDs) or laser diodes (LDs). Also, the electric component 53, which is an LSI or the like, is mounted to the surface of the third layer substrate 41. The electrical wiring 52 is formed in the surface of the substrate 41, and the wiring 52 electrically connects the photoelectric conversion elements 51 and the electric component 53.

As shown in FIG. 2, through holes forming vertical waveguides 42 are formed in the third layer substrate 41 in portions where the photoelectric conversion elements 51 have been mounted, so that the through holes are in opposition to the light-receiving surface or the light-emitting surface of the photoelectric conversion elements 51. The through holes are ordinarily formed substantially perpendicular to the substrate 41, and their cavities function as light transmission paths. Also, one end of the vertical waveguides 42 is optically coupled to the end of the second horizontal waveguides 32 mentioned above. Consequently, the light that is raised up perpendicularly by the light bending portions 34 arranged at the terminal ends of the second waveguides 32 of the second layer substrate can be guided to the photoelectric conversion elements 51 via the vertical waveguides 42.

Also, as shown in FIG. 2, a reflecting film 43 is formed on the wall surfaces of the through holes serving as the vertical waveguides 42 in the same manner as in the first horizontal waveguides. It should be noted that the material and the film thickness of the reflective film 43 are the same as those for the first horizontal waveguides. Similar to the first horizontal waveguides, the cavities constituting the vertical waveguides 42 can remain empty. However, it is preferable that they are filled with a light-transmitting medium. The material of this light-transmitting material is the same as that described above.

The first layer, second layer, and third layer substrates 21, 31, and 41 are joined to one another, forming the optical circuit portion 1. As mentioned above, optical circuits (such as optical circuit elements or waveguides) are formed in each layer of substrates, and by joining the substrates, the optical circuits of the substrates are linked, forming a three-dimensional optical path.

The operation for transmitting light through this three-dimensional light path is described using an example in which the photoelectric conversion elements are light-receiving elements such as photodiodes. Here, the optical circuit portions can function as branching filters. First, light signals are incident on the first layer substrate 21 from an outside light path via the optic fiber 14 and the coupling lens 15 of the coupling portion 2, and are guided into the diffraction grating 28. As shown in FIG. 5, the light signals are split into various wavelength components ($\lambda_1, \lambda_2, \lambda_3, \lambda_4$) by the diffraction grating 28, these are guided into the first horizontal waveguides 26, and are then guided into the surface of the first layer substrate 21. Then, as shown in FIG. 10, the light that has been transmitted through the first horizontal waveguides 26 is reflected by the reflective mirrors of the light bending portions 29 and raised up substantially perpendicularly, passes through the openings formed in the second layer substrate 31, and are incident on the second layer substrate 31. The light is then guided into the second horizontal waveguides 32 by the reflective mirrors of the light bending portions 34 provided in the second layer substrate 31 and are guided into the surface of the second layer substrate 31. Then, as shown in FIG. 2, the light that has been transmitted through the second horizontal waveguides 32 is reflected by the reflective mirrors of the light bending portions 34 provided in the terminal ends of the second horizontal waveguides 32, and are incident on the third layer substrate 41. The light then travels through the vertical waveguides 42 provided in the third layer substrate 41 and arrives at the photoelectric conversion elements 51.

It should be noted that if the photoelectric conversion elements are light-emitting elements such as light emitting diodes (LEDs) or laser diodes (LDs), then the optical circuit portion can function as a multiplexer. Here, light that is emitted from the photoelectric conversion elements is transmitted in the opposite direction to that explained above, is multiplexed by the diffraction grating, and is guided into an outside light path via the coupling portion.

Next, the method for forming the above optical circuit portion will be described.

First, the first layer substrate will be fabricated. Grooves that will become the first horizontal waveguides and a recessed portion that will become the diffraction grating are formed in the substrate surface. If silicon is used as the substrate, then a method that employs lithography and etching can be adopted as the formation method. More specifically, first a resist is applied onto the substrate and a desired diffraction grating pattern and waveguide pattern are transferred to this resist through lithography, after which the resist is developed. Accordingly, the resist is patterned in a shape having openings for a desired diffraction grating pattern and waveguide pattern. The substrate is then etched with this resist serving as a mask, allowing grooves and a recessed portion having predetermined shapes to be formed. There are no particular limitations with respect to the etching, however, it is preferable that dry etching is used. It should be noted that the etching conditions can be suitably selected to correspond to the desired depth of the grooves, for example.

Also, tapers for forming light bending portions are formed in an end of the grooves serving as the first horizontal waveguides. The tapers can also be formed by performing lithography and etching. If a gray-scale mask is used as the exposure mask at the time of the lithography, then the resist itself can be patterned into a shape having a taper, and thus the grooves for the waveguides and the taper can be formed simultaneously if etching is carried out along this resist pattern.

The reflective film is formed on the wall surfaces of the grooves after the etching, however, it is preferable that before this step an oxide film is formed on the substrate surface (including the wall surfaces of the grooves). If a silicon substrate is used, then the method for forming the oxide film can be chemical vapor deposition (CVD) or a thermal oxidizing method, for example. If a glass substrate or a plastic substrate is used, then the oxide film can be formed through chemical vapor deposition (CVD), for example.

After the oxide film has been formed, a metallic film to serve as the reflective film is formed on the wall surfaces of the grooves. At this time, the metallic film is formed on the tapers as well, thus forming the reflective mirrors of the light bending portions. The metal film can be formed through a vapor deposition method, sputtering, or plating, for example, however, it is preferable that plating, and particularly non-electrolytic plating, is employed because it allows the film to be formed uniformly down to narrow portions.

An example of a metallic film formed through non-electrolytic plating is described below. First, before carrying out plating, the grooves and the recessed portion of the substrate are subjected to pre-processing. An example of pre-processing includes adhering a catalyst for inducing the non-electrolytic plating reaction to the grooves and the recessed portion of the substrate. For example, if a layer including Ni is formed through non-electrolytic plating, a pre-process is performed in which solution including a Pd catalyst is brought into contact with the grooves and the recessed portion of the substrate, adhering the Pd catalyst to those surfaces. Then, a non-electrolytic nickel (Ni) plating liquid is brought into contact with the grooves and the recessed portion of the substrate, forming an NiP layer. This is then processed in a substitution-type non-electrolytic gold (Au) plating bath, consequently substituting a portion of the Ni of the NiP layer with Au and forming an Au layer on the surface of the NiP layer. Through this operation it is possible to form a metallic film made of NiP/Au.

The second layer substrate and the third layer substrate are fabricated through substantially the same methods as those mentioned above.

It should be noted that lithography and etching can be employed in the same fashion if the waveguides and the diffraction grating are formed using a glass substrate. It is also possible to employ a conventionally-performed glass molding technique. If a plastic substrate is used, then the plastic substrate can be achieved by fabricating molds having waveguide patterns and diffraction grating patterns, for example, in desired shapes for each substrate using silicon or glass, for example, and then carrying out resin molding using these molds.

Next, the above-mentioned substrates are layered and joined to one another. By joining the substrates, the waveguides formed in the substrates and the optical circuit elements are brought into communication with one another, producing a three-dimensional light path.

If silicon substrates are used, then the substrates can be bonded to one another by a diffusion bonding technique. A diffusion bonding technique is a technique in which the silicon substrates are stacked on one another and thermally processed, thereby chemically joining the Si in the silicon substrate surfaces at the substrate interfaces. The thermal processing temperature is, for example, 900 to 1100° C. and is preferably 1000° C., and the processing time is, for example, one to five hours. Also, the thermal processing is preferably carried out in an inert atmosphere, and is particularly preferably carried out in a nitrogen atmosphere.

If a plastic substrate is used, then the substrates can be bonded using an ultrasound welding. It is also possible to bond them using an adhesive agent such as an ultraviolet curable resin. If glass substrates are used, then they can be bonded to one another using an adhesive agent such as an ultraviolet curable resin.

It is also possible to bond different types of substrates, such as glass and plastic or glass and silicon substrates. Here, the glass and plastic substrates can be bonded by adhering them to one another with an adhesive agent such as an ultraviolet (UV) curable resin, and glass and silicon substrates can be bonded to one another using anode bonding.

In the above description, the reflective films covering the wall surfaces of the waveguides were formed in each substrate before the substrates were joined to one another. However, it is preferable that the substrates are joined and the cavities formed in the substrates (grooves, through holes, etc.) are brought into communication with one another, and then the reflecting films are formed at one time on the wall surfaces of these linked cavities. Thus, if the cavities making up the optical circuits are provided as a single unit and the reflective films are formed at one time on the cavities of the substrates, then the leakage of light from the optical circuits can be effectively inhibited.

Also, in this case, forming the oxide films before the reflective films are formed using a thermal oxidizing method, in particular, allows the oxide films to be formed at one time after the substrates have been joined. However, if a chemical vapor deposition method is used, then it is preferable that the oxide films are formed for each substrate.

In this case, the reflective films can be formed by joining the substrates to one another and immersing the laminated body that is obtained in various types of liquids for carrying out non-electrolytic plating, or they can be formed by forcibly injecting the various liquids into the cavities formed in the laminated body. It is particularly effective to carry out immersion in a vacuum or a reduced-pressure atmosphere. The liquids can be forcibly injected using an injection device such as a micro-syringe or a micro-pump.

An empty waveguide whose wall surfaces are covered by the reflective film can be formed through the above methods, however, it is further preferable that a light-transmitting medium corresponding to each wavelength is filled into the waveguides. This step can be achieved by injecting the medium into the cavities if the medium is a liquid. If a resin is used as the medium, then for example it is possible to forcibly inject a light curable resin in a non-cured state having fluidity using a micro-syringe, for example, into the cavities and then irradiating ultraviolet radiation, for example, from the entrance of the waveguides so as to cure the resin within the waveguides. The reflective film is formed in the waveguides at this time, and thus the light can be efficiently propagated through the waveguides and the resin in the waveguides within the substrates can be effectively cured.

It should be noted that if the reflective films of the waveguides are formed at one time after the substrates have been joined to one another, then it is preferable that a step for removing moisture included in the plating liquid from within the cavities of the waveguides is performed in advance of filling the light-transmitting medium. This step can be performed by injecting an inert gas such as nitrogen gas into the cavities.

After the above processes have been performed, electrical wiring is formed on the surface of the third layer substrate. The electrical wiring can be formed by a conventionally known method, such as a method in which a metallic film is formed by sputtering or vapor deposition, for example, after which the metallic film is patterned through lithography and etching. It is also possible to use a lift-off method. Furthermore, the electrical wiring can be formed through plating. The photoelectric conversion elements and the electric component are mounted onto the surface of the third layer substrate. This mounting can be achieved using solder or an adhesive agent, for example.

Furthermore, as shown in FIG. 1, in the optical circuit portion 1, a metallic layer 101 is layered on the rear surface of the substrate 21 (the first layer substrate), which is the bottommost layer. Depending on the type of the photoelectric conversion elements and the electric component that are mounted onto the optical circuit portion, they may give off heat when operating. For example, if laser diodes are employed as the photoelectric conversion elements, then heat is generated when light is emitted. In this embodiment, by layering the metallic layer 101 onto the rear surface of the substrate 21 of the bottommost layer, the heat that is stored in the substrate can be efficiently discharged through the metallic layer even if heat is generated as mentioned above.

Also, by laminating the metallic layer 101, the substrate is less prone to cracking because it is given added toughness. For example, even if the thickness of the substrate is 100 $\mu$m or less, by laminating of the metallic layer, the substrate can be given enough sturdiness that in practice is it not damaged.

The metal for forming the metallic layer 101 is preferably a metal with good heat transmission properties, such as Cu, Ni, or Cr. The thickness of the metallic layer 101 is for example 10 to 1000 $\mu$m, and is preferably 100 to 500 $\mu$m.

When the metallic layer 101 is joined to the substrate 21, it is preferable that microscopic projections or depressions are formed in the surface of the substrate 21 that is joined to the metallic layer 101. The microscopic projections or depressions are ordinarily made of the same material as the substrate. There are no particular limitations regarding the height or the depth of the microscopic projections or depressions, however, they are at least 10 nm and not more than 100 μm. Also, there are no particular limitations regarding the pitch of the microscopic projections or depressions, and thus the pitch is, for example, at least 10 nm and not more than 100 μm.

The microscopic projections or depressions can for example be formed through the following method if the substrate is silicon. First, an organic compound layer such as Teflon is formed on the silicon substrate and the silicon substrate is subjected to dry etching from above the organic compound. After dry etching has been performed for a set period of time, an organic compound layer is once again formed and then dry etching is once again performed for a set period of time. By repeating this operation, any number of pin-shaped silicon projections are formed on the surface of the silicon substrate. The height of the pin-shaped projections can be controlled through manipulating the dry etching time and the number of operations. For example, if the etching time is set to three minutes and the operation is carried out ten times, then pin-shaped projections with an average projection height of 1.2 μm can be formed. The organic compound layer can be set to a suitable thickness, and this can, for example, be about 50 nm.

Here, it is preferable that reactive ion-etching (RIE) is adopted as the method for the dry etching. In this case, the etching gas can be suitably selected from fluorine-based gases or compound gases in which $O_2$ or the like is mixed with a fluorine-based gas, for example, depending on the characteristics of the film. Examples of the fluorine-based gas include $CHF_3$, $CH_2F_2$, $CH_3F$, $CF_4$, $C_2F_6$, $C_2F_4$, $C_3F_8$, and $C_4F_8$.

Also, if a glass substrate is used, then the gas of the dry etching can be changed to a gas such as $SF_6$, $BCl_3$, or $Cl_2$ in order to yield similar microscopic pin-shaped recessions and projections.

On the other hand, if a glass substrate is used, then changing the etching gas in the dry etching to $SF_6$, $BCl_3$, or $Cl_2$ and changing the etching liquid in the wet etching to hydrofluoric acid (HF) or buffered hydrofluoric acid (BHF) allows microscopic projections or depressions to be formed through the same method as that for the silicon substrate.

The metallic layer 101 is formed on the surface of the substrate 21 to which the micro projections or recessions are formed as mentioned above, and plating or the like may be used as the method for forming the metallic layer 101. As the plating method it is possible to use the same non-electrolytic plating method as the above-described method for forming the reflective films of the waveguides. In other words, an oxide film is formed on the substrate surface through thermal oxidation, for example, and the surface is subjected to processing, after which the metallic layer can be formed through non-electrolytic plating. Alternatively, a primer layer can be formed through non-electrolytic plating and then a metallic film can be grown through electrolytic plating in order to cover this primer layer. In this case, it is possible to adopt a method in which an NiP film is formed as the primer layer and the metallic layer is formed through electrolytic plating using Ni or Cu, for example.

Thus, by employing non-electrolytic plating, an extremely uniform metallic layer can be formed on the substrate surface on which the tiny recesses and projections are formed. This is because the film that is formed through non-electrolytic plating is chemically bound to the substrate surface. By combining this chemical bonding with the physical bonding due to anchoring effects between the film and the tiny recesses and projections of the substrate, the substrate and the metallic layer can be joined soundly to one another.

It should be noted that electrolytic plating can be used to form the metallic layer. In this case, the substrate and the metallic layer are joined to one another only by the anchoring effects, but they are joined sturdily to one another by suitably selecting the height of the micro projections and the depth of the depressions of the substrate, their pitch, and their shape, for example.

As shown in FIG. 1, an optical communication device is made by combining the coupling portion 2 and the optical circuit portion 1. At this time, one end of the waveguides formed in the optical circuit portion 1 is disposed in opposition to the light coupling component of the coupling portion 2. As shown in FIG. 1, the optical circuit portion 1 and the coupling portion 2 are arranged so that the incidence opening to the optical circuit element 28 (diffraction grating) formed in the first layer substrate 21 is in opposition to the coupling lens 15 (see FIG. 4). Consequently, the optical circuit portion 1 is optically coupled to the optic fiber 14 via the coupling lens 15, and moreover it can be optically coupled to an outside light path via the optic fiber.

It should be noted that in FIG. 1, an example is shown in which the coupling portion 11, fabricated as a separate component, is mounted onto the first layer substrate 21. However, the present invention is not limited to this. For example, it is also possible to form a mounting groove or the like in the surface of the first layer substrate and then mount a light coupling component such as an optic fiber directly onto the first layer substrate.

In the above description, an example was shown in which the optical circuit portion was made of three substrate layers, however, the present invention is not limited to this. The optical circuit portion can also be constituted by only a single substrate layer or by four or more substrate layers.

Also, in the above description, electrical wiring was formed on the surface of a substrate making up the optical circuit portion and through this electrical wiring the photoelectric conversion elements and the electric component were connected. However, the present invention is not limited to this configuration. For example, if the reflective films formed in the waveguides are constituted by a conductive material such as a metallic film, then the reflective films can be used as the electrical wiring.

Also, in the above description, an example was shown in which the photoelectric conversion elements and the electric component were mounted onto the optical circuit portion. However, the present invention is not limited to this. For example, optical components can be mounted onto the third layer substrate in place of the photoelectric conversion elements and the electric component. FIG. 16 shows an example of an optical communication device with this configuration. In the example shown in FIG. 16, a micro lens array made of the optic fiber 14 and convex lens surfaces 103 in either surface of a transparent plate is mounted as the optical component. By adopting this configuration, the optical communication device can be used as a light-light coupling element. The method for mounting the optical component onto the third layer substrate may be carried out in the same manner as the above-described method for mounting the light coupling component in the coupling portion. It is also possible to adopt one of the methods mentioned later in the second through fourth embodiments.

Second Embodiment

In the first embodiment, an example was shown in which in the coupling portion, a light-coupling component was fastened to a support body by an adhesive agent. However, in order to more firmly fasten these, it is preferable that they are fastened through a metal bond such as solder. Such a configuration is described below.

In this embodiment, a mounting groove and adhesion grooves are formed in a support body making up a coupling portion in the same manner as in the first embodiment. It should be noted that in this embodiment, silicon is preferably used as the support body. However, it is also possible to use plastic or glass, for example.

Here, a metallic film is formed at least at the portion of the mounting groove that is in contact with the light coupling component. This metallic film is preferably formed not only in the mounting groove but also on the wall surfaces of the adhesion grooves. Examples of the metal include Au, Ag, Ni, and Cu, although Au is particularly preferable because of its excellent resistance to corrosion. The metallic film can be formed through a plating method, and it is preferably formed through non-electrolytic plating because this allows the film to be formed uniformly over the entire groove.

An example of a method for forming the metallic film through non-electrolytic plating is described next. First, the support body is subjected to pre-processing before plating is executed. If a layer including Ni is to be formed through non-electrolytic plating, an example of pre-processing is a process for immersing the support body in a solution including a Pd catalyst so as to adhere the Pd catalyst to its surfaces. Then, the support body is immersed in a non-electrolytic plating bath. An example of this step is first to process the support body in a substitution-type non-electrolytic nickel (Ni) bath so as to form an NiP layer. Then, this is processed in a substitution-type non-electrolytic gold (Au) plating bath, thereby substituting Au for a portion of the Ni of the NiP layer and forming an Au layer on the surface of the NiP layer. Through this operation, a metallic film made of NiP/Au can be formed.

The metallic film is also formed on the surface of the light coupling portion that is adhered to the support body (that is, its lateral surface). The metal for this film can be one of the metals mentioned above. Also, various types of publicly known methods may be adopted to form this metal film, but it is preferable that plating is used and particularly preferable that non-electrolytic plating is used. The metallic film is preferably formed on the light coupling component before it is arranged in the mounting groove of the support body.

The metallic film can be formed on the lateral surfaces of the optical coupling component by the same method as that used to form the metallic film on the support body. However, because light must be passed from the incidence surface to the emission surface of the light coupling component, the metallic film must be formed on surfaces other than the incidence and emission surfaces, that is, on only the lateral surfaces of the light coupling component. The method described below can be used to form the metallic film on only the lateral surfaces of the light coupling component.

First, the incidence and emission surfaces of the light coupling component are covered by carbon or carbon fluoride to lower the surface energy of the incidence surface and the emission surface. The surfaces can be covered by carbon by sputtering the carbon, for example. They may also be covered by carbon fluoride through a plasma process using a gas that includes fluoride, such as $CF_4$ or $C_2F_6$.

Next, the light coupling component is subjected to non-electrolytic processing. This step will be described using an example in which an NiP/Au layer is formed through non-electrolytic nickel (Ni) plating and non-electrolytic gold (Au) plating. To induce the non-electrolytic Ni plating reaction, it is necessary to adhere a Pd catalyst to the surface of the light coupling component. The incidence and emission surfaces of the light coupling component are covered with carbon or carbon fluoride as above so as to lower their surface energy. For this reason, in the step where the light coupling component is immersed in a solution of the Pd catalyst, the Pd catalyst does not adhere to the incidence and emission surfaces of the light coupling component and is adhered only to the lateral surfaces of the light coupling component. After this step, the NiP layer is formed only on the lateral surfaces of the light coupling component when the light coupling component is immersed in the non-electrolytic Ni plating bath. The light coupling component is then immersed in a substitution-type non-electrolytic Au plating bath. By substitution-type non-electrolytic Au plating, Au is substituted for the Ni of the NiP layer, forming an Au layer. Therefore, Au is plated only on the lateral surfaces on which the NiP layer is formed. Through this series of operations, the NiP/Au layer is formed only on the lateral surfaces of the light coupling component.

As mentioned above, in this embodiment the light coupling component is mounted to the support body by soldering. A metallic film is formed on the surfaces of the light coupling component and the support body in contact with one another, thus making it possible to connect them through soldering. Adhering them using solder yields higher adhesion strength than adhering them using a resin or the like, thus allowing the light coupling portion to be more firmly fastened onto the support body.

In the above description, adhering using solder was described, but the light coupling component can similarly also be firmly fastened onto the support body through other metal bonding techniques, such as metal deposition.

Also, in the above description, adhesion grooves were provided in the support body in the same manner as in the first embodiment, however, there is no particular requirement to provide adhesion grooves in this embodiment.

Third Embodiment

In the second embodiment, an example was shown in which the light coupling component was fastened to the support body by metal bonding in order to achieve strong adhesion at the coupling portion. However, by processing at least one of the light coupling portion and the support body using a silane coupling agent, strong adhesion can be achieved even with an adhesive agent. Such a configuration allows the light coupling component and the support body to be firmly fastened by adhering without forming metallic films on the light coupling component and the support body. This configuration is described below.

In this embodiment, first a silane coupling agent is applied to at least the portion of the mounting groove of the support body that comes into contact with the light coupling component. The silane coupling agent is also applied to the surface of the light coupling component that is adhered to the support body (that is, its lateral surfaces). The two are then fixedly adhered to one another by an adhesive agent such as an ultraviolet curable resin.

At this time, it is preferable that the silane coupling agent that is used is hydrolyzed, and the hydrolyzed silane coupling agent is applied to at least the lateral surfaces of the light coupling component and the mounting groove of the support body, after which the light coupling component and the support body are fixedly adhered to one another by an ultraviolet curable resin. It is further preferable that after the hydrolyzed silane coupling agent has been applied, the light coupling component and the support body are subjected to thermal processing and then the two are fixedly adhered to one another with an ultraviolet curable resin. The thermal processing temperature is for example at least 120° C., is preferably 120 to 200° C., and is more preferably 120 to 150° C.

It should be noted that in the example described above, processing using a silane coupling agent was performed with respect to both the support body and the light coupling component. However, this processing may also be carried out with respect to only one of the support body and the light coupling component.

Also, in this embodiment, adhesion grooves can be provided in the support body like in the first embodiment, however, there is no particular requirement that the adhesion grooves are provided.

Fourth Embodiment

This embodiment is described with respect to a configuration in which a micro lens or a micro lens array is used as the coupling lens of the coupling portion.

The micro lens has a structure in which a pair of convex lens surfaces are provided in either surface of the transparent plate. The micro lens array has a structure in which a plurality of pairs of the convex lens surfaces are provided. It should be noted that the transparent plate and the convex lens surfaces are preferably made of the same material and also provided as a single unit.

Such a micro lens (array) is advantageous because by forming a pair of lens surfaces in both surfaces of the transparent plate, it becomes easy to align the optical axes. Also, when a micro lens (array) of the same material as the support body is used, the lens and the bench can be set to the same coefficient of expansion, and thus the precision of the optical axis alignment is further increased.

Silicon is preferably used as the micro lens (array). Because silicon has a high refractive index, the curvature of the lens can be reduced and aberration can be lowered so as to reduce the spot diameter of the focal point. Thus, silicon has the advantage that it allows the micro lens (array) to be made compact. Moreover, it is easy to provide a flat array surface and to form a plurality of convex lens surfaces at one time through a technique such as dry etching. Furthermore, if a reflection preventing film or the like is formed on the convex lens surfaces, then forming that film over the entire surface of the transparent plate allows the film to be formed at one time on a plurality of convex lens surfaces.

Disposing a silicon micro lens (array) on the support body allows the lens (array) to be directly fixed to the support body without using an adhesive agent, for instance.

Figure 13:
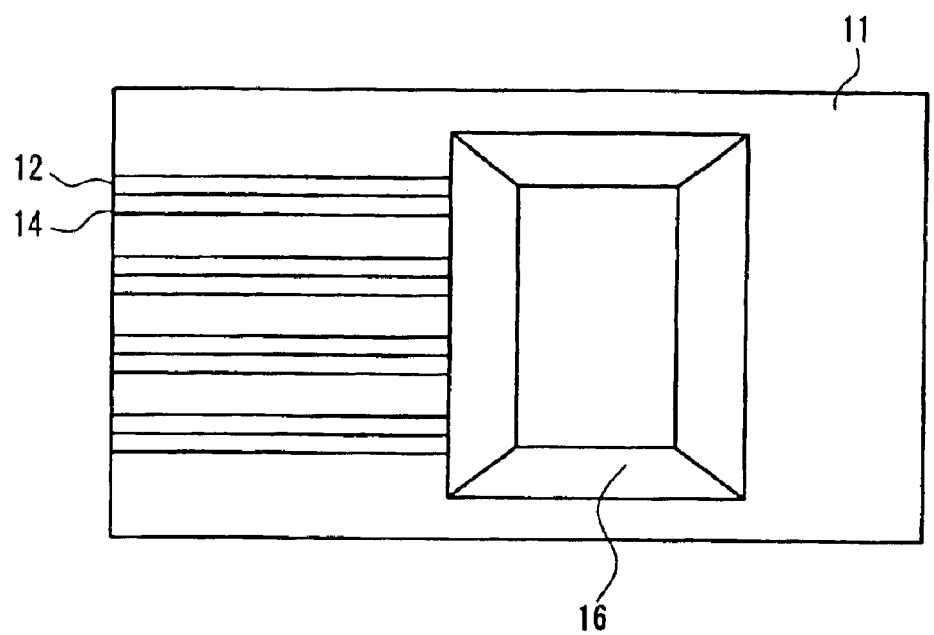
FIG. 13 is a plan view showing another example of the support body of the coupling portion of the optical communication device.
Figure 14:
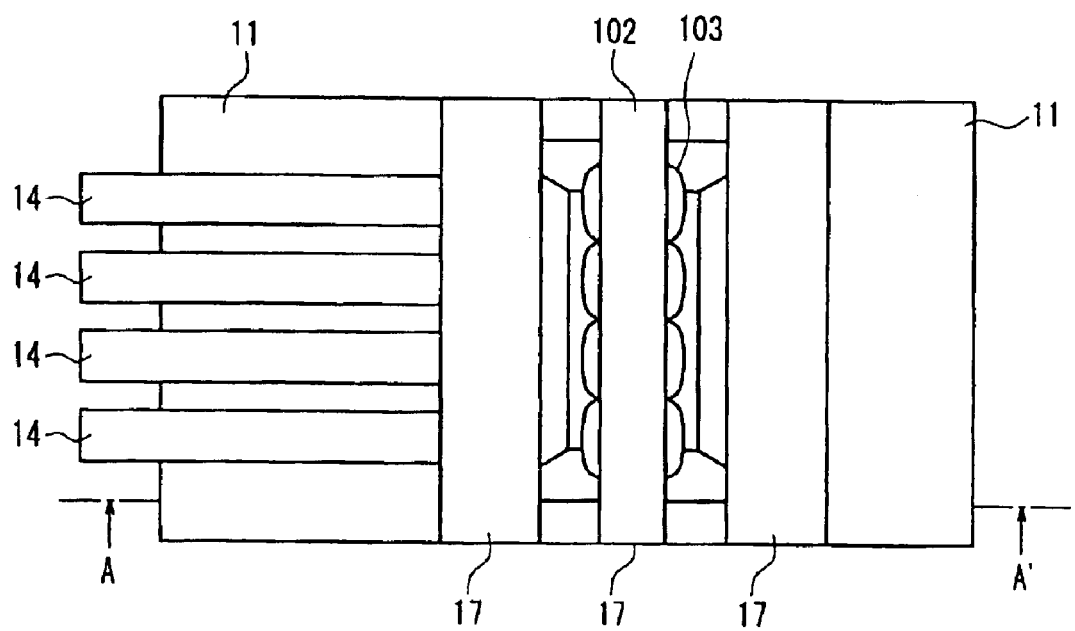
FIG. 14 is a plan view showing another example of the coupling portion of the optical communication device, and shows how the optic fiber and the micro array lens are fastened to the support body.

FIGS. 13 and 14 are plan views for illustrating such a fastening method. First, as shown in FIG. 13, anisotrophic etching is performed against the support body 11 to form an inverted plateau-shaped groove 16. Then, a groove (fastening groove) 17 perpendicular to the support body surface is formed by dicing. It should be noted that the reference numeral 12 in FIG. 13 denotes the mounting grooves for mounting the optic fibers and 14 denotes the optic fibers that are fastened in the mounting grooves. Then, as shown in FIG. 14, a micro lens array made by integrally forming the convex lens surfaces 103 in both surfaces of the transparent plate 102 is inserted and fastened in the fastening groove 17. FIG. 15 is a cross-sectional view showing the micro lens array fastened to the support body. Thus, the micro lens array can be easily fastened to the support body.

It should be noted that the method for mounting the micro lens (array) to the support body is not limited to this method, and it is also possible to mount it using a metal bond such as solder or by joining it to the support body using an adhesive agent.

If a metal bond such as solder is used, then a metallic film can be formed on the portion of the micro lens (array) that is adhered to the support body (the portion other than the convex lens surfaces) and a metallic film is formed on the wall surfaces of the fastening groove of the support body, and the two can then be joined to one another by solder, for example. It should be noted that the metallic film can be formed on the micro lens (array) using the same method as that described in the second embodiment.

If an adhesive agent is used, then it is preferable that a silane coupling agent is applied to at least one of the portion of the micro lens (array) that is adhered to the support body (the portion other than the convex lens surfaces) and the wall surfaces of the fastening groove of the support body, and then the two are adhered to one another. It should be noted that processing using a silane coupling agent can be carried out in the same manner as described in the third embodiment.

Fifth Embodiment

A preferable embodiment of the optical communication module of the invention is described next. This optical communication module is configured as a laminated body made by layering a plurality of substrates directly onto one another. At least one of a horizontal waveguide and a vertical waveguide is formed in each substrate. The waveguides formed in the substrates are optically coupled to one another by light bending portions provided with reflective mirrors. Thus, the waveguides formed in the substrates are in communication with one another, constituting a three-dimensional light path that extends three-dimensionally.

More specifically, the optical communication module has a configuration in which at least a first substrate and a second substrate are directly layered onto one another in close adherence. Formed as cavities in the interior of the first substrate are horizontal waveguides; light bending portions that are positioned at an end portion of the horizontal waveguides and that bend the light path substantially perpendicularly, and in which reflective mirrors are disposed; and first horizontal waveguide portions that are contiguous with the light bending portions and that continue in the thickness direction to the surface. The second substrate is layered on top of the first substrate, and second vertical waveguide portions that continue from the surface to the interior in the thickness direction are formed, as cavities, in spots that are in opposition to the exposed portions of the first vertical waveguide portions that lead to the substrate surface. A vertical light path formed as cavities that pass from the first substrate to the second substrate in the thickness direction is formed inside the laminated body made of the first substrate and the second substrate.

It should be noted that the optical communication module can be made of a first substrate and a second substrate. However, it may also have at least one additional substrate outside the first substrate or the second substrate. That is, if the optical communication module is made of a laminated body having three or more substrates, then it is sufficient that one location where substrates are adjacent to one another satisfies the above criteria.

An example of this optical communication module has substantially the same structure as the optical circuit portion described above in the first embodiment. It should be noted that a detailed description thereof is omitted because it is the same as the optical circuit portion according to the first embodiment.

A plurality of the optical communication modules can be optically coupled to one another, forming an optical communication device. There are no particular limitations regarding how the optical communication modules are coupled to one another, and one example is to layer the modules onto one another. In this case, the modules can be layered using the same method as that illustrated in the first embodiment for joining the substrates of the optical circuit portion. It is also possible to form a plurality of modules within the same laminated substrate and then couple these modules to one another through waveguides or the like formed in the laminated substrate. It is also possible to couple the modules to one another via light coupling components such as optic fibers.

Sixth Embodiment

Next, examples of a component making up an optical communication device or an optical module of the present invention, and a component used in combination with an optical communication device or an optical communication module of the present invention, are described. These components are of course not related to an optical communication device or an optical communication module of the invention, and can also be used independently.

(1) An optical communication device is characterized in that a metallic layer is joined to at least one surface of a substrate, and that micro projections or depressions of the same material as the substrate are formed in the junction surface interface between the substrate and the metallic layer. With this optical communication device, heat stored in the substrate can be efficiently discharged and the substrate can be kept from cracking or warping, for example.

(2) An optical communication device precursor in which the end face of an optical waveguide is covered by carbon or carbon fluoride. This precursor is processed in a non-electrolytic nickel (Ni) plating bath and a non-electrolytic gold (Au) plating bath, yielding an optical communication device in which only the incidence surface and the emission surface of the optical communication device are subjected to NiP/Au plating. This optical communication device is fixedly adhered to an optical bench on which a metallic film has been formed.

WORKING EXAMPLES

Hereinafter, working examples are used to describe a method like that described in the second embodiment for fastening the support body (optical bench) and the light coupling component in the coupling portion using a metal bond. However, these working examples are only illustrative examples, and do not limit the present invention.

Working Example 1

A carbon film is formed to a thickness of 10 nm through sputtering on the end surfaces of an optical lens made of glass having an outer diameter of 1 mm and a length of 2 mm. The optical lens made of glass is then immersed in a non-electrolytic Ni plating bath. Through this operation, NiP is plated onto only the lateral surfaces of the optical lens made of glass. Next, the optical lens made of glass is immersed in a substitution-type non-electrolytic Au plating bath, and Au is plated on the NiP. Anisotrophic etching is employed to form an inverted plateau-shaped groove with a width of 1000 µm, a depth of 500 µm, and a length of 5 mm in the (100) face of an Si wafer 1.5 mm thick. Then, the silicon optical bench (hereinafter, referred to as "SiOB") is immersed in the non-electrolytic Ni plating bath. Through this operation, NiP is plated onto the SiOB surface. Next, the SiOB is immersed in a substitution-type non-electrolytic Au plating bath, and Au is plated onto the NiP. The optical lens made of glass that has been metallized with NiP/Au is placed on the SiOB, and the two are fixedly adhered to one another by solder.

Working Example 2

In the same manner as in Working Example 1, except that the end surfaces of an optical lens made of glass having an outer diameter of 1 mm and a length of 2 mm reprocessed by $CF_4$ gas plasma, only the lateral surfaces of the optical lens made of glass are plated. Then, in the same manner as in Working Example 1, after NiP/Au is plated onto the surface of the SiOB, the optical lens made of glass metallized with the NiP/Au is placed on the SiOB and the two are fixedly adhered to one another by solder.

Comparative Working Example 1

Anisotrophic etching with KOH was adopted to form an inverted plateau-shaped groove with a width of 1000 µm, a depth of 500 µm, and a length of 5 mm in the (100) face of an Si wafer 1.5 mm thick. An optical lens made of glass having an outer diameter of 1 mm and a length of 2 mm is placed on the SiOB, and ultraviolet radiation at a wavelength of 365 nm is irradiated, adhering the two to one another by ultraviolet curable resin.

The samples obtained in Working Examples 1 and 2 and in Comparative Working Example 1, in which the optical lens made of glass is fixedly adhered in the inverted plateau-shaped groove of the SiOB, were stored for one week in an 85° C., 90% RH environment. Separation of the optical lens made of glass did not occur in Working Examples 1 and 2, however, with the sample prepared in Comparative Working Example 1, the optical lens made of glass separated from the inverted plateau-shaped groove of the SiOB.

The samples obtained in Working Examples 1 and 2 and in Comparative Working Example 1, in which the optical lens made of glass is fixedly adhered in the inverted plateau-shaped groove of the SiOB, were subjected to ten heat cycle tests of 85° C. for two hours followed by −40° C. for two hours. For Working Examples 1 and 2, separation of the optical lens made of glass did not occur, however, with the sample prepared in Comparative Example 1, the optical lens made of glass separated from the inverted plateau-shaped groove of the SiOB.

Several embodiments of the present invention where described in the foregoing, however, the present invention is not limited to the embodiments illustrated herein. In other words, the scope of the invention is limited only by the scope of the appended claims.

What is claimed is:

1. A laminated optical communication module, comprising:
   a substrate;
   a vertical waveguide that is formed in the substrate and that is for transmitting light in a thickness direction of the substrate;
   a horizontal waveguide that is formed in the substrate and that is for transmitting light in a planar direction of the substrate; and
   a light bending portion for optically coupling the vertical waveguide and the horizontal waveguide;
   wherein the substrate is a laminated body including a first substrate in whose surface a groove is formed and in which a reflective mirror is disposed on at least one end of the groove, and a second substrate layered to the surface of the first substrate in which the groove is formed and in which a through hole in communication with a portion of the groove where the reflective mirror is disposed is formed;

wherein the horizontal waveguide comprises a first cavity formed by the groove and a first reflective film that covers the wall surfaces of the first cavity, and transmits light through its first cavity;

wherein the vertical waveguide comprises a second cavity formed by the through hole and a second reflective film that covers the wall surfaces of the second cavity, and transmits light through its second cavity; and wherein the light bending portion comprises the reflective mirror, and due to reflection at the surface of the reflective mirror, the light transmission direction is changed from the thickness direction to the planar direction of the substrate or from the planar direction to the thickness direction of the substrate.

2. The laminated optical communication module according to claim 1, further comprising, in the substrate, an optical circuit element that is optically coupled to at least one of the horizontal waveguide and the vertical waveguide.

3. The laminated optical communication module according to claim 1, further comprising a photoelectric conversion element that is optically coupled to an end of the waveguide, and electrical wiring formed in the surface of the substrate;

wherein the photoelectric conversion element can be electrically connected to an outside electrical circuit via the electrical wiring.

4. The laminated optical communication module according to claim 1, wherein the first reflective film, the second reflective film and the reflective mirror are made of a metallic film.

5. The laminated optical communication module according to claim 1, wherein a light-transmitting medium is filled into the first and second cavities constituting the vertical waveguide and the horizontal waveguide.

6. An optical communication device made by optically coupling a plurality of optical communication modules to one another, wherein at least one of the optical communication modules is the laminated optical communication module according to claim 1.

* * * * *